United States Patent
Landon

(10) Patent No.: US 8,591,979 B2
(45) Date of Patent: Nov. 26, 2013

(54) MULTIPHASE OIL CONTINUOUS FLAVOR AND INGREDIENT DELIVERY SYSTEM

(75) Inventor: Todd Landon, Mound, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 1011 days.

(21) Appl. No.: 12/241,789

(22) Filed: Sep. 30, 2008

(65) Prior Publication Data

US 2010/0080884 A1    Apr. 1, 2010

(51) Int. Cl.
 *A21D 6/00* (2006.01)
 *A21D 10/00* (2006.01)
 *A23D 7/00* (2006.01)
 *A23D 9/00* (2006.01)

(52) U.S. Cl.
 USPC ............ 426/496; 426/549; 426/601; 426/602

(58) Field of Classification Search
 USPC ........................ 426/496, 549, 602
 See application file for complete search history.

(56) References Cited

U.S. PATENT DOCUMENTS

| | | | | |
|---|---|---|---|---|
| 3,506,448 A | * | 4/1970 | Kleinschmidt et al. | 426/33 |
| 3,917,859 A | | 11/1975 | Terada et al. | 426/602 |
| 4,366,180 A | | 12/1982 | Altrock et al. | 426/602 |
| 6,136,364 A | | 10/2000 | Merchant et al. | 426/602 |
| 6,746,700 B1 | | 6/2004 | Landon | 426/93 |
| 7,510,737 B2 | * | 3/2009 | Bialek et al. | 426/602 |
| 7,575,769 B2 | * | 8/2009 | de Levita et al. | 426/94 |
| 2006/0029713 A1 | * | 2/2006 | Eckert | 426/581 |

FOREIGN PATENT DOCUMENTS

| | | | |
|---|---|---|---|
| EP | 0354600 | * | 7/1990 |
| EP | 0717595 | * | 11/1998 |
| JP | 2004-097113 | * | 2/2004 |

* cited by examiner

*Primary Examiner* — Humera Sheikh
*Assistant Examiner* — Bhaskar Mukhopadhyay
(74) *Attorney, Agent, or Firm* — Dorsey & Whitney LLP; Bridget M. Hayden, Esq.

(57) ABSTRACT

A food ingredient delivery system for delivering food ingredients during manufacture of a food product comprising a multi-phase emulsion including a pumpable oil1 within water or aqueous solution within oil2 emulsion wherein the oil1 comprises solid milk derived fat droplets sequestered in an aqueous phase with the aqueous phase being dispersed in the oil2, the oil2 comprising a liquid, continuous vegetable based fat matrix.

25 Claims, 3 Drawing Sheets

MULTIPHASE OIL CONTINUOUS FLAVOR AND INGREDIENT DELIVERY SYSTEM

BACKGROUND OF THE INVENTION

This invention relates to a delivery system for delivering a milkfat component to dough and in particular delivering a milkfat component to dough through the use of an emulsion deliverable in liquid form Emulsions are mixtures of two immiscible substances. One substance, known as the dispersed phase, is dispersed in the form of droplets into the second substance referred to as the continuous phase. Two of the most common emulsions are either an oil in water emulsion or a water in oil emulsion. In an oil in water emulsion (o/w), water is the continuous phase and oil is the dispersed phase, thus droplets of oil are dispersed in an aqueous solution. Conversely, in a water in oil (w/o) emulsion, oil is the continuous phase and water is the dispersed phase. These emulsions with two phases are referred to as primary emulsions. Examples of emulsions include butter, margarine, milk and cream. In butter and margarine, fat surrounds droplets of water (a water-in-oil emulsion). In milk and cream, water surrounds droplets of fat (an oil-in-water emulsion).

The two components of an emulsion are (typically) chemically unreactive and therefore, emulsions have low thermodynamic stability. Emulsifiers are often added to emulsions to stabilize them. Both hydrophilic and lipophillic emulsifiers are known in the art and can be used based on the type of emulsion formed.

Multiple emulsions are also known in the art and are more complex than primary emulsions. In multiple emulsions, a primary emulsion is formed first and subsequently dispersed into another continuous phase. In other words, droplets of the primary emulsion are dispersed in a continuous phase that is different than the continuous phase of the primary emulsion. For example, in an oil in water in oil multiple emulsion, an o/w primary emulsion is dispersed in an oil continuous phase. In multiple emulsions, the internal and external phases are similar (but not necessarily identical) and an intermediate phase separates the two like phases. The intermediate phase is immiscible with the two similar phases. Multiple emulsions are generally formed in a two step process.

There are multitudes of crackers in the marketplace today with a variety of bases and flavors. All of these generally contain a starch, such as flour, and a fat source. The amount and type of fat, the type of flour and the additional ingredients added to a cracker dough distinguishes the many types and flavors of crackers from each other. The cracker dough is generally made by blending melted fats, flavor components and flour into a mixture to achieve maximum materials handling benefits and product quality.

SUMMARY

This disclosure relates to a food ingredient delivery system for delivering food ingredients during manufacture of a food product. The food ingredient delivery system includes a multi-phase emulsion comprising a pumpable oil1 within water or aqueous solution, the water or aqueous solution within an oil2, forming the multi-phase emulsion. Oil1 comprises a milk derived solid fat in droplets sequestered in an aqueous phase to form an o/w primary emulsion./aqueous phase system. The aqueous phase is dispersed in oil2, oil2 comprising a liquid, continuous vegetable based fat matrix.

Another aspect relates to a dough system comprising flour and an oil1 in water in oil2 emulsion wherein oil1 comprises a solid milk derived fat in droplet form within an aqueous phase. The aqueous phase is dispersed in oil2, the oil2 comprising a liquid, continuous vegetable based fat phase.

Another aspect of this disclosure includes a method for delivering a food ingredient into a dough for subsequent cooking. The method comprises dispersing milk derived fat into an aqueous phase to produce an oil1 in water primary emulsion wherein the milk derived fat is substantially solid. The water primary emulsion is dispersed into a liquid vegetable based fat to produce an oil1 in water in oil2 emulsion in liquid form. The oil1 in water in oil2 emulsion is then dispersed into the dough.

DETAILED DESCRIPTION OF ILLUSTRATIVE EMBODIMENTS

Figure 1A:
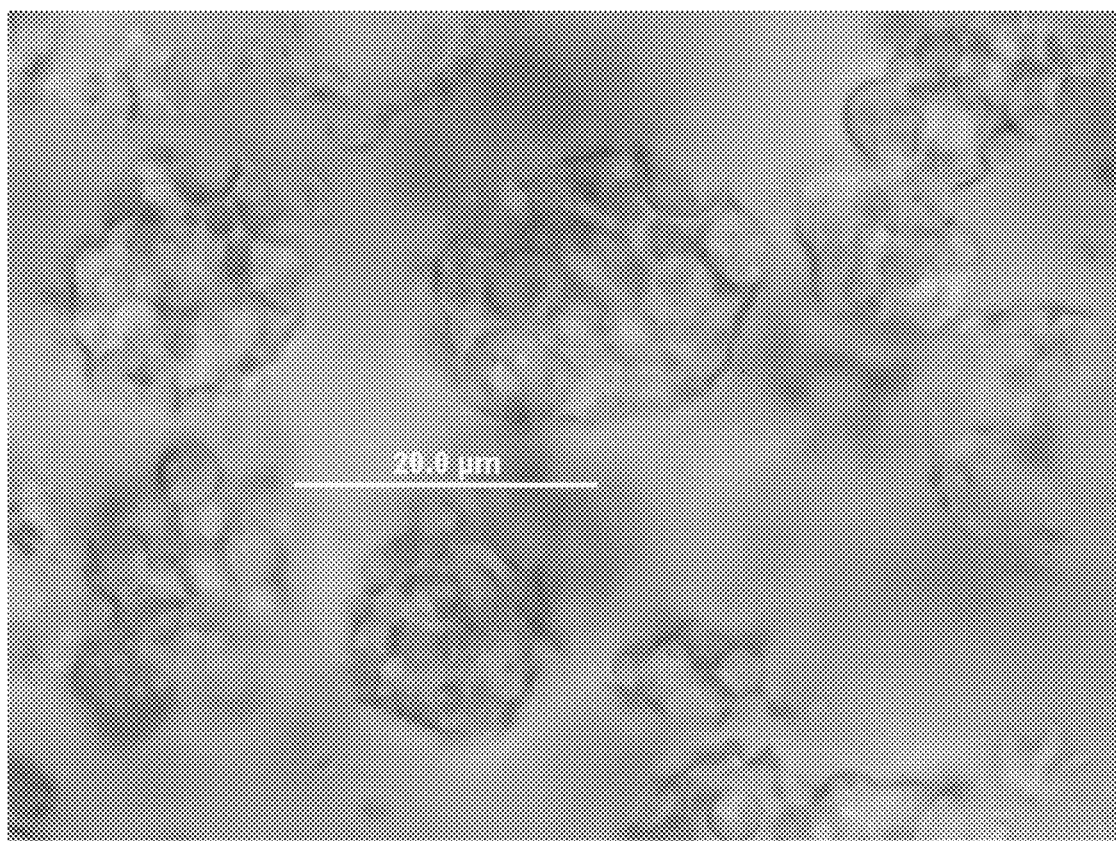
FIG. 1a is a photomicrograph of the oil1/water/oil2 emulsion of the present invention.

The present invention includes a delivery system for delivering into dough a milkfat in water emulsion by utilizing a continuous vegetable oil phase as the delivery medium. An additional feature is that flavors and other ingredients may be included in the water phase of the emulsion. The continuous vegetable oil phase is a liquid at least at typical production plant temperatures so that the milkfat component is easily pumpable even at less than typical ambient production plant temperatures.

A milkfat/saturated fat component is important in a finished product such as a cracker since the milkfat/saturated fat component has an affect on the crispness sometimes referred to as "shortness" of the final product. The delivery system of the milkfat/saturated fat component keeps separate the milkfat component from the vegetable oil delivery for the milkfat to function as intended in the dough. In other words, the milkfat is not compromised due to intersolubilizing with the vegetable oil.

To achieve this end, the delivery system is assembled as an oil-in-water-in-oil (o/w/o) emulsion. The o/w/o system provides a spatial arrangement between the intersoluble fats providing material handling benefits while providing maximum impact of the milkfat component to the dough. This spatial arrangement of the o/w/o emulsion allows for the incorporation of oil soluble/oil dispersible (OS/OD) components in the internal oil phase such that the OS/OD components remain separate from the continuous vegetable oil phase primarily due to the water phase.

For purposes of distinguishing the oil phases described herein, the internal oil phase will be referred to as oil1 (o1) and the external continuous oil phase will be referred to as oil2 (o2). The emulsion described herein is then a multi-phase emulsion described as an oil1 in water in oil2 (o1/w/o2) emulsion.

Oil1 includes a solid fat at ambient temperatures, such as milkfat. The milkfat can be butterfat such as the stearine component of butterfat. The milkfat is dispersed in an aqueous phase to form an oil1 in water emulsion sometimes referred to herein as the primary emulsion.

This o1/w primary emulsion is then dispersed in the oil2 phase that is generally a pumpable liquid to form the multi-phase emulsion that remains pumpable even at low ambient temperatures. Pumpability in a production setting is important to achieve production efficiencies.

Stability of the primary emulsion is accomplished through several factors. The dispersed oil in o1 is dispersed in liquid form and is reduced in size to about 2 to about 5 microns. OS/OD components such as emulsifiers (lecithin) or naturally occurring emulsifiers found within the o1, and/or in the primary emulsion continuous phase (o1/w), aid in stabilizing the o1 globules.

The aqueous phase (w) may include water soluble/water dispersible ingredients (WS/WD). WS/WD ingredients may include flavors and other ingredients.

Both oil1 and oil2 may also include oil soluble/oil dispersible ingredients (OS/OD). Oil1 and the OS/OD ingredients included in oil1 are compartmentalized within the aqueous phase of the primary emulsion. WS/WD ingredients are compartmentalized to the aqueous phase by the oil2 and any OS/OD ingredients in oil2 are compartmentalized in the liquid continuous phase. Thus, OS/OD and WS/WD ingredients useful in a dough system can be delivered by one pumpable emulsion but sequestered within three different phases. The spatial arrangement of the OS/OD components and WS/WD components within the o1/w/o2 emulsion is advantageous for delivering concentrated levels of flavor and making a final product with an improved taste profile. The delivery of the fat and other food components in the unique spatial arrangement within o1/w/o2 emulsion of this invention results in a superior dough system. Food products made using this dough system have improved crispness and flavor delivery.

Crackers are often characterized by their "shortness" which refers to the crispness and to a desirable taste profile and mouthfeel. The presence and the delivery method of the fat components to a dough system can affect the shortness of a cracker. The use of the o1/w/o2 emulsion system described herein in a dough system to deliver the fat and flavor components is advantageous because the overall continuous oil phase can act as a moisture barrier to the aqueous phase. The aqueous phase can, in turn, act as a barrier between the two fat systems (o1 and o2) thus reducing the likelihood of intersolubility between the phases. The reduction and/or elimination of intersolubility between oil1, oil2 and aqueous phases leads to an improved dough system, as well as to a desirable taste profile of the resulting product.

The oil1 phase of the o1/w/o2 emulsion of the present invention generally includes solid fat. Solid fat generally refers to fat components that are substantially solid at ambient temperatures. Generally, the melting point of oil1 is higher than about 60° F. Preferably, the melting point of the oil1 is higher than about 90° F. Typical butterfat has a melt point of about 94° F. A fractionated butterfat stearine component, that may add more shortness to the finished product, has a melting point of about 115° F.

In preferred embodiments, the solid fat is a milkfat. The milkfat may be, for example, butter, margarine, and combinations thereof. Other dairy products that contain milkfat may also be used in the oil1 phase. In more preferred embodiments, the oil1 is butter and/or margarine derived from cow's milk.

The aqueous phase of the multi-phase emulsion can be a variety of liquids. Preferably, the aqueous phase naturally has oil in water emulsifying capabilities. In preferred embodiments, the aqueous phase is a buttermilk solution. Buttermilk has it's own natural oil-in-water emulsifying capabilities. Other components useful in the aqueous phase include butter serum, nonfat dry milk or blends thereof including blends with buttermilk. A brine solution may also be used as the aqueous phase. The choice may depend on the flavoring desired in the final product.

The oil2 phase of the emulsion described herein is primarily a liquid. Oil2 is preferably any suitable vegetable oil. The oil2 can be, for example, soybean oil, corn oil, coconut oil, canola oil, peanut oil, olive oil, safflower oil and/or combinations thereof. The oil2 is a liquid below ambient temperatures. The melting point of oil2 is generally below about 75° F. Preferably, the melting point of oil2 is between about 40 and about 70° F.

Figure 2:
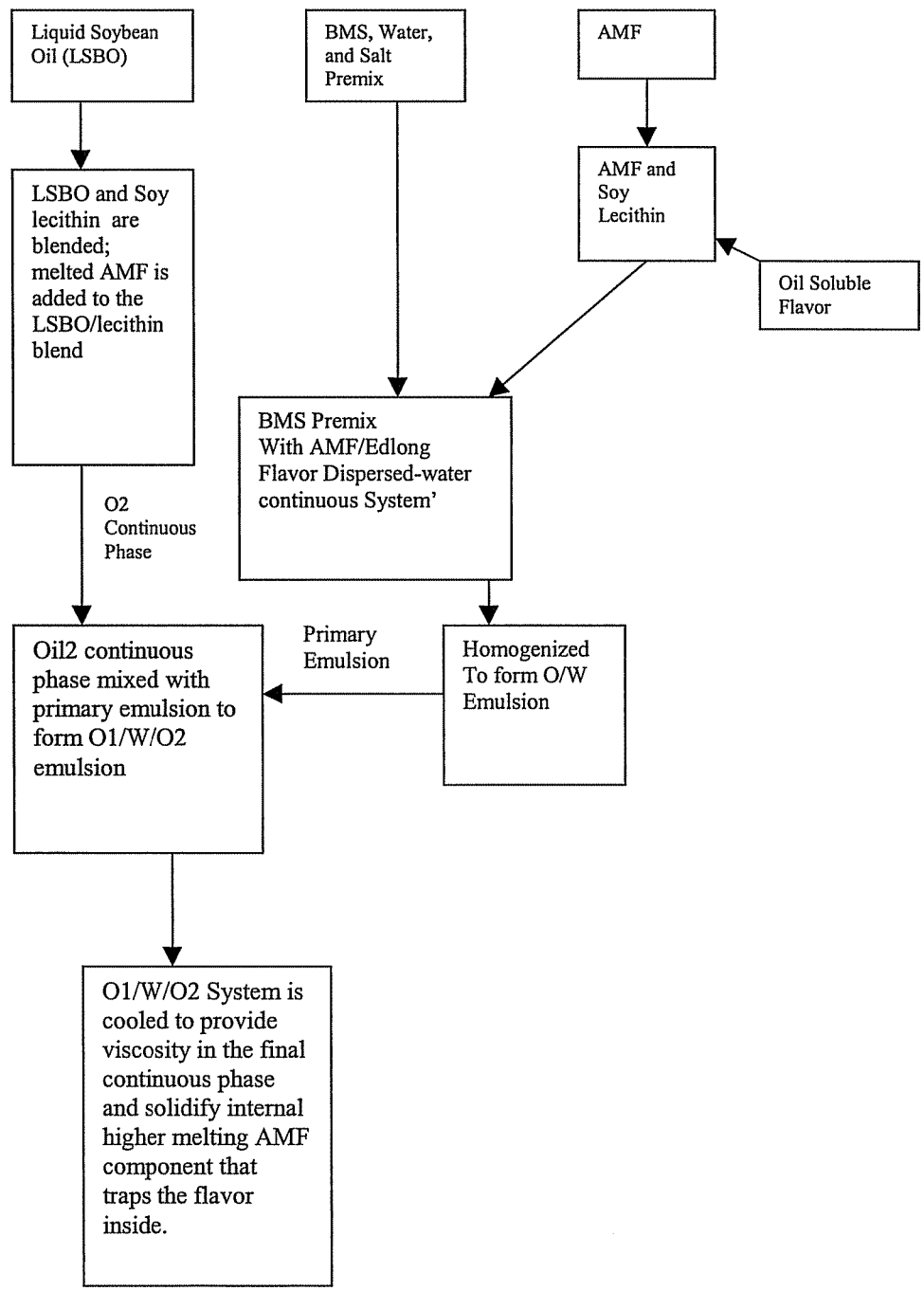
FIG. 2 is a schematic view of an embodiment of this invention.

A flow chart of the process of the present invention is illustrated in FIG. 2. In referring to the process flow chart in FIG. 2, a specific example will be described with specific amounts for purposes of better understanding this invention. Such amounts disclosed should not be used to restrict or limit this invention in any way.

As illustrated in FIG. 2, Liquid Soybean Oil (LSBO) from a source is transferred to a tank in which Soy Lecithin is mixed with LSBO. A small portion of Anhydrous Milkfat (AMF) is melted and added to the LSBO and the Soy Lecithin mixture to form the O2 continuous phase. The small amount ranges from 3-11% by weight of the overall product and preferably 4-6% by weight. As small amount of AMF (crystallizing fat) as possible is added to the liquid oil continuous phase sufficient to provide some viscosity to Oil 2 to aid in stabilizing the dispersed primary emulsion when the primary emulsion is mixed with Oil2. In addition, flavors and/or a small amount of distilled monoglycerides can also be added. A specific example of one composition that was made is set forth in the table below.

The primary emulsion made from a premix of Buttermilk Solids (BMS), water and salt solution. Anhydrous Milkfat (AMF) is blended with Soy Lecithin and a flavor such as Edlong Water Solution FL. 1410919 is added to the system. Specific amounts of one example are set forth in the table below. The BMS, water and salt premix and the AMF and Soy Lecithin flavored mix are then blended and homogenized to form the primary emulsion. The primary emulsion is then mixed with the Oil2 continuous phase by using a prop-style (such as a Lightnin Mixer) mixing device/agitator, preferably with variable speeds to increase/decrease dispersion rate and energy input, that mechanically shears the primary phase in to droplets within O2 continuous phase to form the O1/W/O2 emulsion.

| Ingredient | Weight | Percent |
|---|---|---|
| Primary Emulsion | | |
| AMF | 455.135 | 20.050 |
| Water | 412.232 | 18.160 |
| Salt | 32.915 | 1.450 |
| Buttermilk Solids | 49.8492 | 2.1960 |
| Edlong Water Sol. FL.1410919 | 69.008 | 3.040 |
| Soy Lecithin | 2.7694 | 0.122 |
| Oil2 Continuous Phase | | |
| Liquid Soybean Oil | 1110.03 | 48.900 |
| Distilled Mono glycerides | 0.908 | 0.040 |
| AMF | 99.88 | 4.400 |
| Soy Lecithin | 2.7694 | 0.122 |
| Edlong Oil soluble FL, 1410918 | 34.504 | 1.520 |
| Total | 2270 | Total 100.000 |

The amount of oil1, water and oil2 can vary in the emulsion system of the present invention. Generally, oil1 is dispersed in the aqueous phase at a ratio of between about 25:75 to about 75:25 by weight. Preferably, the ratio of oil1:water is at a ratio of between about 40:60 to about 60:40. The oil1:water emulsion droplets size can vary and are at least about 1 micron. Preferably, the oil1:water emulsion droplets are between about 2 microns and about 10 microns. The ratio of the primary emulsion to the oil2 phase is about 40:60 to 60:40 and preferably about 50:50.

The oil1 and oil2 phases may also include OS/OD food components. The OS/OD can include, for example, emulsifiers, flavor components, colors, vitamins and the like. Emulsifiers can be soy lecithin, distilled monoglcerides, polyglycerol esters of fatty acids and/or combinations of such emulsifiers. Flavor components can be cheese flavors such as cheddar flavor, Oil Soluble Cheese Flavor 1410918, available from the Edlong Flavor Corporation—225 Scott Street, Elk Grove Ill.

The aqueous phase may also include WS/WD food components. WS/WD can include, for example, salt, colors, milk solids, sugars/CHO, enzymes to develop flavors, and flavors such as Edlong water soluble flavor #1410919.

The primary emulsion (o1/w) of the multi-phase o1/w/o2 emulsion can be made by combining the oil1 and any desired OS/OD components with the aqueous phase with any desired WS/WD components. The oil1 and the aqueous phase can be combined, for example, with a mixer. Other methods of combining are known in the art and may be used to form the primary emulsion. The speed with which the oil1 and the aqueous phase are combined and the temperature at which they are combined can vary. In one exemplary embodiment, the oil1 and aqueous phase are combined at medium speed and at temperature between about 68° F. and about 70° F. The primary phase is made by low pressure, single-stage homogenization to achieve the selected Oil 1 droplet size dispersion.

The primary emulsion of o1/w can then be incorporated into oil2 to form the multi-phase o1/w/o2 emulsion. As described above, oil2 is generally a liquid at temperatures that the multi-phase emulsion is generated. The primary emulsion can be incorporated into oil2 by a variety of suitable methods. An exemplary method used to produce the multi-phase emulsion is to add the O1/W primary emulsion to the O2 continuous phase at a temperature such that the O2 maintains a viscosity that aids in stabilizing the formed primary phase droplets and provides significant crystallization to the O1 higher melting component fat. This type of addition helps to prevent intersolubilizing of the two oil phases. Preferred temperature ranges are dependent on the oil blends but are typically 50-70° F. The overall O1/W/O2 final mix temperature is controlled by using a jacketed vessel or waterbath system.

Figure 1B:
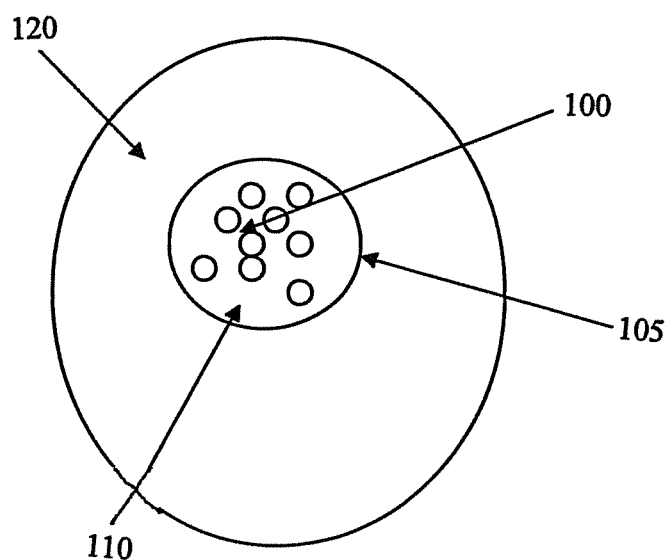
FIG. 1b is a schematic representation of the oil1/water/oil2 emulsion of the present invention.

Incorporation of the primary emulsion into the oil2 results in droplets of the primary emulsion being dispersed within the oil2. FIG. 1a is a microscopic picture of the multiphase emulsion. FIG. 1b shows a schematic of the multiphase emulsion with oil 100 sequestered within aqueous phase droplets 110. The aqueous droplets 110 are dispersed in the liquid phase oil2 120. The size of the primary emulsion fat droplets 100 can vary and are generally at least about one micron and more preferably 2-5 microns in diameter. The O1/W primary emulsion droplets 105 are between about 15 microns and about 25 microns. Primary emulsion droplets greater than about 25 microns are also within the scope of this invention. The multi-phase emulsion formed retains the pumpable nature of the oil2 and therefore, can be advantageous for delivery of the emulsion to a dough system.

The multi-phase emulsions described herein can be used as the fat source to generate improved dough systems. Dough systems generally include flour, fat or fats and other ingredients such as emulsifiers, flavors and the like to form the desired dough. Dough is generally made by combining the liquid ingredients with the dry ingredients. Dry ingredients generally used in dough systems include flour such as, for example, wheat flour, rice flour, white flour, potato flour, oat flour and the like. In addition, salt, sugar, baking soda and the like may also be present. In a dough production system, it is generally advantageous to deliver fat in a liquid form since it can be pumped in and easily combined, as opposed to delivering the fat in a solid form.

Improved dough systems can be made by delivering the pumpable multi-phase emulsion to the dry ingredients. In preferred embodiments, the multi-phase emulsion can be delivered by pumping the o1/w/o2 emulsion directly into some or all of the dry ingredients. Other means of delivering liquids to the dry ingredients may be used and are within the scope of this invention. Addition of other components into the flour or the dough system, prior to delivery of the emulsion or after the delivery of the emulsion into the dough system is also within the scope of this invention.

As described above, the multi-phase emulsion can include a number of OS/OD and WS/WD components such as flavors, emulsifiers and the like. All of these components are compartmentalized into the appropriate phase and any intersolubility between components is substantially reduced or eliminated due to the phase boundaries. It has been found that the dough system made from the emulsions of this invention has different characteristics than a dough system made from the same components but which are delivered without the spatial arrangement imposed by the multi-phase emulsion.

The dough system made by using the o1/w/o2 emulsion has improved characteristics. The dough generally has increased pliability and reduced stickiness. Any flavors that may have been incorporated in the emulsion are better protected leading to a superior flavor in the finished product. Additionally, since a combination of liquid oil (oil2) and solid fat (oil1) are used, the dough may have a healthier fat profile.

The dough can have a fat content between about 2 percent by weight and about 12 percent by weight. Preferably, the dough has a fat content between about 4 percent by weight and about 8 by weight. The moisture content of the dough can be between about 15 percent and about 30. Preferably, the moisture content of the dough is between about 20 percent and about 26 percent.

The dough system described herein can be used to make a variety of cooked dough products. Cooked dough products can include, without limitation, crackers, crisps, cookies and the like. In some exemplary embodiments, the dough system has been used to make crackers/crisps that are flavored with, for example, cheese.

The dough products can be made by using the dough system described above. The dough may be flattened by rolling, pressing, or other flattening means. The dough may be separated into small pieces, for example, by cutting. Alternatively, the dough may be used without flattening. The pieces of dough may be cooked by any of the known methods for cooking such as baking, deep frying, steaming and the like. Alternatively, the dough or the dough pieces may be stored prior to cooking.

The dough products of the present invention can include a variety of products. The products may be made from wheat, rice, potato, soy, oats and the like. The products may include a number of flavors including cheddar, parmesan, garlic, butter, herb-type flavors, and meaty/savory-type flavors. Dough products such as crackers/crisps made using the dough system with the multi-phase emulsion are particularly desirable. The dough products may be consumed alone or they may be consumed with additional ingredients such as toppings. The crackers/crisps have a crispy, tender taste. In exemplary embodiments, crackers have the crispy, tender taste with a hint of butter in the background. Crackers with incorporated cheese flavors have the true, clean cheese notes carrying through as opposed to off-flavored cheese. Dough products can be made with a healthier fat profile yet maintaining the stability imparted by the multi-phase emulsion. In addition, the dough products made according to the invention can have reduced costs due to the ease of production protocols and the use of less expensive materials.

Methods of delivering food components are also within the scope of this invention, particularly with respect to making dough systems. These methods include compartmentalizing food components based on their hydrophilic or lipophilic characteristics and generating multi-phase emulsions with these compartmentalized food components. The use of spatial arrangement of food components can produce superior food products with desirable taste and nutrition profile.

The present invention contemplates a variety of packaged embodiments. The multi-phase emulsion may be packaged and delivered to a user. The user may use the emulsion to combine with the desired flour and additional ingredients to make the dough system. The user may also then cook the dough to make the finished dough product. The dough systems described herein can also be packaged and delivered to the consumer. The consumer may cook the packaged dough into the product, when desired. Alternatively, the cooked dough products may be packaged and sold to consumers in a ready to eat form. Other packaged embodiments containing the multi-phase emulsion, the dough system and/or the cooked dough products are also within the scope of this invention.

Although the present invention has been described with reference to preferred embodiments, workers skilled in the art will recognize that changes may be made in form and detail without departing from the spirit and scope of the invention.

What is claimed is:

1. A food ingredient delivery system for delivering food ingredients during manufacture of a food product, the system comprising:
   combined dry ingredients, the dry ingredients comprising flour; and
   a milkfat-in-water-in-oil emulsion, the milkfat-in-water-in-oil emulsion comprising:
      a pumpable multi-phase emulsion comprising an oil1 within an aqueous phase within an oil2, wherein the oil1 comprises solid milk derived fat droplets sequestered in the aqueous phase with the aqueous phase being dispersed in the oil2, the oil2 comprising a liquid, continuous vegetable based fat matrix;
   wherein the emulsion is delivered in liquid form for thoroughly mixing with the dry ingredients to form dough for cooking; and
   wherein the milk derived fat of the oil1 has a melting point of higher than about 90° F.

2. The system of claim 1 wherein the oil1 comprises butter.

3. The system of claim 1 wherein the intersolubility between the oil1 and oil2 is substantially eliminated.

4. The system of claim 1 wherein the aqueous phase comprises buttermilk.

5. The system of claim 1 comprising oil soluble/oil dispersible ingredients in the oil1 or oil2 or both.

6. The system of claim 1 comprising flavor based ingredients dispersed in the water of the aqueous phase.

7. The system of claim 1 further comprising cheese and/or cheese based ingredients dispersed in the water of the aqueous phase.

8. The system of claim 1 comprising one or more emulsifiers in the oil1 or oil2 or both.

9. The system of claim 1 wherein the aqueous phase further comprises water soluble/water dispersible ingredients.

10. The system of claim 1 wherein the ratio of oil1 to water in the aqueous phase is between about 40/60 and about 60/40 by weight.

11. The system of claim 1 wherein the aqueous phase is dispersed in the vegetable based fat matrix as droplets, the droplets being between about 15 and about 25 microns.

12. The system of claim 1 wherein the fat content of the multi-phase emulsion is between about 70 percent and about 85 percent by weight.

13. The system of claim 1 wherein the moisture content of the multi-phase emulsion is between about 15 percent and about 30 percent by weight.

14. The system of claim 1 wherein the milk derived fat is butter, margarine or combinations thereof.

15. The system of claim 1 wherein the oil 1 further comprises cheese and/or cheese flavors within the aqueous phase or oil 1 component.

16. A method of cooking dough, the method comprising:
   combining dry ingredients, the dry ingredients comprising flour;
   forming a milkfat-in-water-in-oil emulsion, wherein the milkfat-in-water-in-oil emulsion comprises a pumpable multi-phase emulsion comprising an oil1 within an aqueous phase within an oil2, wherein the oil1 comprises solid milk derived fat droplets sequestered in the aqueous phase and has a melting point of higher than about 90° F., the aqueous phase being dispersed in the oil2, the oil2 comprising a liquid, continuous vegetable based fat matrix, wherein forming the milkfat-in-water-in-oil emulsion comprises the steps of:
   dispersing the solid milk derived fat into the aqueous phase to produce an oil1 in water primary emulsion; and
   dispersing the primary emulsion into the oil 2 liquid, continuous vegetable based fat to produce an oil 1 in water in oil2 emulsion in a pumpable form, thereby forming the milkfat-in-water-in-oil emulsion; and
   dispersing the milkfat-in-water-in-oil emulsion in liquid form into combined dry ingredients and thoroughly mixing with the dry ingredients to form the dough; and
   cooking the dough.

17. The method of claim 16 wherein the oil1 further comprises oil soluble/oil dispersible ingredients and the aqueous phase forms a barrier to prevent intersolubility between oil1 and oil2.

18. The method of claim 16 wherein the primary emulsion forms droplets within the oil2 and the droplets are between about 15 microns and about 25 microns.

19. The method of claim 16 wherein the aqueous phase comprises buttermilk.

20. A cooked dough product produced by the method of claim 16 exhibiting an improved taste profile.

21. The product of claim 20 wherein the cooked dough product is a cracker.

22. The method of claim 16 wherein cooking comprises at least one of baking, deep frying, or steaming.

23. The method of claim 16 further comprising packaging the dough prior to cooking.

24. The method of claim 16 wherein cooking comprises cooking at least one of a cracker, crisp, or cookie.

25. The system of claim 1 wherein the dough is formed for cooking at least one of a cracker, crisp, or cookie.

* * * * *